US007984149B1

(12) United States Patent
Grayson (10) Patent No.: US 7,984,149 B1
(45) Date of Patent: Jul. 19, 2011

(54) METHOD AND APPARATUS FOR IDENTIFYING A POLICY SERVER

(75) Inventor: Mark Grayson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1702 days.

(21) Appl. No.: 10/912,431

(22) Filed: Aug. 4, 2004

(51) Int. Cl.
 *G06F 15/16* (2006.01)
(52) U.S. Cl. .......................... 709/226; 709/227
(58) Field of Classification Search .......... 709/226–238; 370/231–392; 713/185; 725/1–281; 726/1
See application file for complete search history.

(56) References Cited

U.S. PATENT DOCUMENTS

| | | | | |
|---|---|---|---|---|
| 6,226,684 | B1 * | 5/2001 | Sung et al. | 709/238 |
| 6,571,095 | B1 * | 5/2003 | Koodli | 455/435.1 |
| 6,584,454 | B1 * | 6/2003 | Hummel et al. | 705/59 |
| 6,587,876 | B1 * | 7/2003 | Mahon et al. | 709/223 |
| 6,611,873 | B1 * | 8/2003 | Kanehara | 709/238 |
| 6,810,525 | B1 * | 10/2004 | Safadi et al. | 725/1 |
| 6,937,566 | B1 * | 8/2005 | Forslow | 370/231 |
| 6,973,054 | B2 * | 12/2005 | Bjelland et al. | 370/310 |
| 7,143,151 | B1 * | 11/2006 | Kayashima et al. | 709/223 |
| 7,337,224 | B1 * | 2/2008 | Van Horne et al. | 709/225 |
| 7,340,047 | B2 * | 3/2008 | Fijolek et al. | 379/211.02 |
| 7,418,253 | B2 * | 8/2008 | Kavanagh | 455/410 |
| 7,437,441 | B1 * | 10/2008 | Drew et al. | 709/223 |
| 2001/0056459 | A1 * | 12/2001 | Kurose et al. | 709/201 |
| 2002/0174228 | A1 * | 11/2002 | Kanemaki et al. | 709/226 |
| 2003/0097454 | A1 * | 5/2003 | Yamakawa et al. | 709/229 |
| 2003/0101278 | A1 * | 5/2003 | Garcia-Luna-Aceves et al. | 709/240 |
| 2003/0108015 | A1 * | 6/2003 | Li | 370/338 |
| 2003/0217174 | A1 * | 11/2003 | Dorenbosch et al. | 709/237 |
| 2004/0068572 | A1 * | 4/2004 | Wu | 709/229 |
| 2004/0120296 | A1 * | 6/2004 | Lee et al. | 370/338 |
| 2004/0236829 | A1 * | 11/2004 | Xu et al. | 709/204 |
| 2004/0243718 | A1 * | 12/2004 | Fujiyoshi | 709/237 |
| 2005/0038906 | A1 * | 2/2005 | Banes et al. | 709/238 |
| 2005/0068935 | A1 * | 3/2005 | Bajko et al. | 370/351 |
| 2005/0163060 | A1 * | 7/2005 | Riley et al. | 370/254 |
| 2005/0259654 | A1 * | 11/2005 | Faulk, Jr. | 370/392 |
| 2006/0023658 | A1 * | 2/2006 | Phillips et al. | 370/328 |
| 2006/0209768 | A1 * | 9/2006 | Yan et al. | 370/338 |
| 2006/0262755 | A1 * | 11/2006 | Kilgore | 370/332 |
| 2007/0025301 | A1 * | 2/2007 | Petersson et al. | 370/338 |
| 2008/0263365 | A1 * | 10/2008 | Aupperle et al. | 713/185 |
| 2009/0164648 | A1 * | 6/2009 | Xu et al. | 709/228 |
| 2009/0187968 | A1 * | 7/2009 | Roese et al. | 726/1 |

OTHER PUBLICATIONS

Cullen, John, "Better Service Quality, Better Efficiency," Nokia Library Article, 2003, located on the internet at <http://www.nokia.com/nokia/0,,53714,00.html>, 4 pages. (Text Provided on CD-Rom).
JH Software, "Reverse Look Up / in-addr.arpa," Simple DNS Plus version 4.00, located on the internet at <http://www.simpledns.com/help/index.html?df_reverse.htm> , 2 pages. (Text Provided on CD-Rom).
Johnson, D. et al., "Mobility Support in IPv6," The Internet Society, Network Working Group, Request for Comments 3775, Jun. 2004, pp. 1-165. (Text Provided on CD-Rom).
Sun Microsystems, "UMTS and IPv6," PowerPoint presentation, May 2001, located on the internet at <http://playground.sun.com/pub/ipng/html/presentations/May2001/UMTS_IPv6_rev3 IPNG.ppt>, 34 pages. (Text Provided on CD-Rom).

* cited by examiner

*Primary Examiner* — Bunjob Jaroenchonwanit
(74) *Attorney, Agent, or Firm* — Hickman Palermo Truong & Becker LLP (57) ABSTRACT

A method is disclosed of identifying a policy server in relation to a session invoked by an invoking node on a network via a network access node. The method comprises the steps, performed at an application server, of receiving a session request and extracting a session identifier from the session request. The method further comprises the step of obtaining a policy server address from said session identifier.

24 Claims, 7 Drawing Sheets

| Legend | |
|---|---|
| Item No. | Label |
| 100 | Client Terminal/Mobile Station |
| 102 | Base Substation |
| 104 | Access Gateway |
| 106 | Network |
| 108 | Packet Data Network |
| 110 | Application Server |
| 112 | Application Function |

METHOD AND APPARATUS FOR IDENTIFYING A POLICY SERVER

FIELD OF THE INVENTION

The present invention generally relates to networks. The invention relates more specifically to a method and apparatus for identifying a policy server.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

With the advent of third generation/next generation networks and the increasing growth and complexity of communications networks, network operators and service providers are exploring the manner in which differentiated services can be offered to end users in conjunction with methods of policing such services. For example services can be differentiated by type of content such as web server, streaming content, gaming or by differentiated quality of service for different users.

As a result it is necessary to be able to identify the service requirements of a user taking into account factors such as location of the user and the network to which they attach, location of the service provider and the identity of the network operator providing basic subscription services to the user. In addition both service providers and network operators need to ensure that appropriate accounting structures are put into place to ensure that the user is charged correctly for use of the services. The situation is rendered more complex yet by the increasing mobility of networks. For example a mobile or wireless network user with a mobile terminal such as a laptop or cell phone may log on to different networks at different times to initiate different sessions and indeed may roam between multiple networks each potentially operated by a different identity during a single session.

A known solution is to apply a policy retrieved from a policy database to a session between a mobile terminal and a network provider. The policy determines Quality of Service (QoS) such as allocation of bandwidth to the session, the charging structure applied and so forth. As a result a level of scalability is provided as policies can be defined to deal with specific session types rather than requiring individual configuration of an appropriate structure for each session, which is clearly not scalable.

Figure 1:
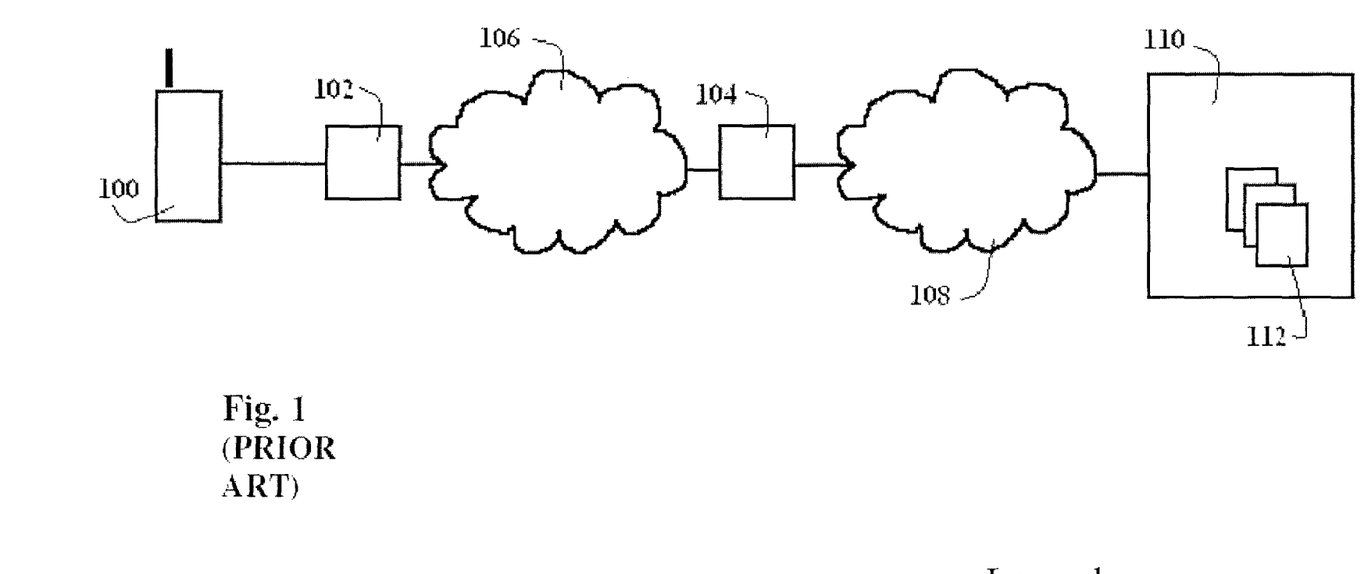
FIG. 1 is a block diagram showing the components of a network using a known policy implementation approach.
Figure 2:
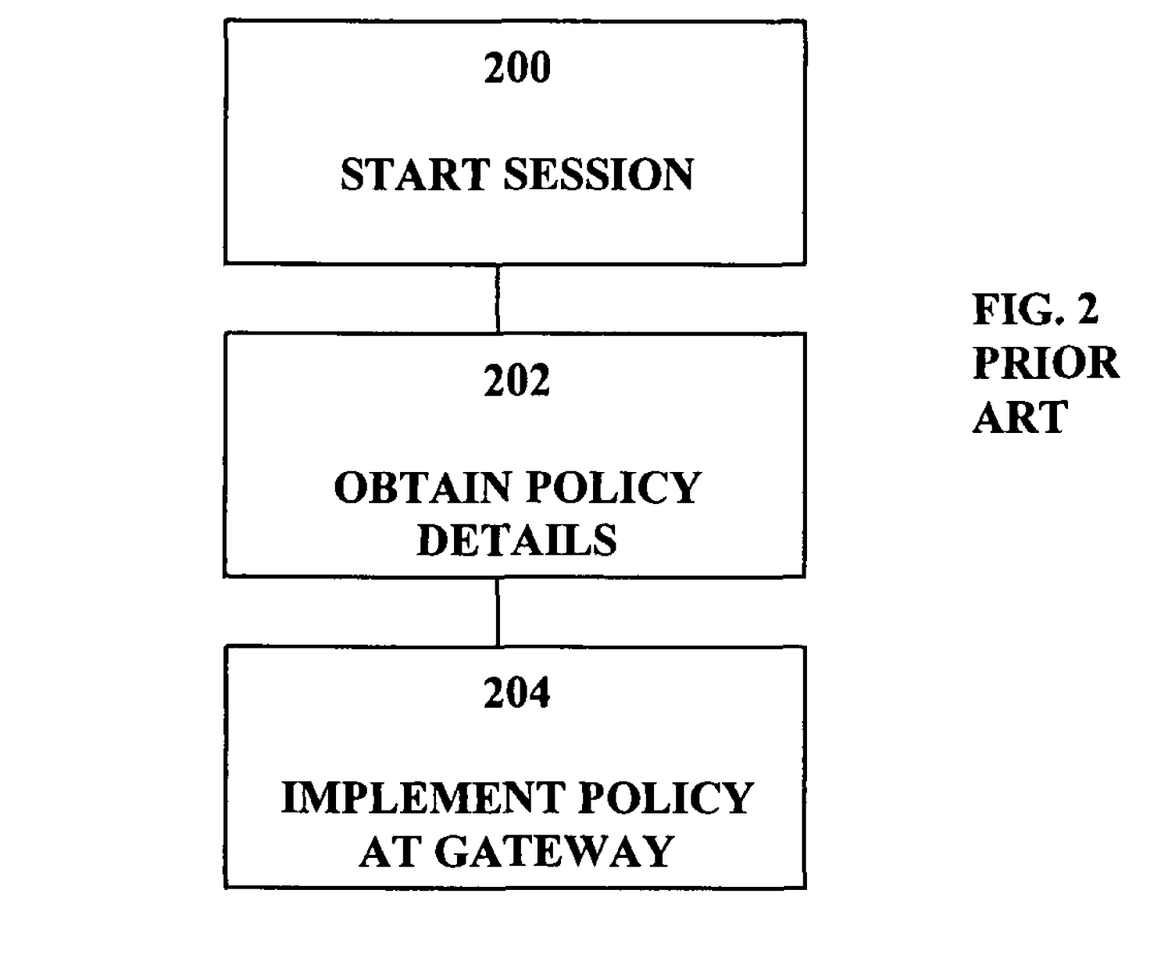
FIG. 2 is a flow diagram illustrating a high level view of the known policy implementation approach.

One approach to policy implementation is described in "Better Service Quality, Better Efficiency" by John Cullen, which is available at the time of writing on the file "0,53714,00.html" in the directory "nokia" of the domain "nokia.com" of the World Wide Web. The approach described can be understood with reference to FIG. 1 which is a block diagram showing the components of a network implementing the approach and FIG. 2 which is a flow diagram illustrating a high level view of the approach described. Referring to FIG. 1 a client terminal or mobile station (MS) 100 for example a mobile terminal such as a cell phone connects wirelessly to a network via a base station sub-system (BSS) 102. The BSS 102 is connected to an access gateway 104 via a network 106. The access gateway 104 provides access to a packet data network (PDN) 108 such as the Internet to which is connected an application server 110 such as a content provider providing an application function 112 such as, for example, provision of streaming video. In the event that the user at the MS 100 wishes to call up a function of the application server then it is necessary to invoke a session initiated by wireless attachment to the BSS 102. In particular, with regard to FIG. 2, in block 200 the MS starts the session including communicating with and attaching to the BSS 102, providing address details and, for example, quality of service requirements, proceeding through an authentication check and establishing a connection with the appropriate access gateway 104. In block 202 appropriate policy details are obtained. For example the BSS 102 or gateway 104 obtains a QoS profile from a database such as a home location register (HLR, not shown) maintained by the network operator to which the MS subscribes. In block 204 the access gateway obtains the relevant policy from its policy control function (PCF, not shown) and implements the policy in relation to the session. But whenever a particular session is initiated to invoke functions of the application server, the same policy is always used; the application server in effect is statically tied to the policy or policy server.

As networks become larger and more complex, and as the number and frequency of mobile users increases, it will be seen that an essentially static approach where the application function is hard coded to the policy server will suffer from severe scalability issues. According to its state, an application function may require policy to be implemented on its behalf but the application server may be in a different administrative domain than the access gateway. Furthermore there may be many application functions each supporting servers using different access gateways and possibly different access technologies such as mobile IP (Internet Protocol) according to which the user's traffic may be tunneled through its home network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for identifying a policy server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Identifying a Policy Server
4.0 Implementation Mechanisms - Hardware Overview
5.0 Extensions and Alternatives 1.0 General Overview The needs identified in the foregoing Background, and other needs and objects that will become apparent for the following description, are achieved in the present invention, which comprises, in one aspect, a method of identifying a policy server in relation to a session invoked by an invoking node on a network via a network access node. The method comprises the steps, performed at an application server of receiving a session request and extracting a session identifier from the session request. The method further comprises the step of obtaining a policy server address from said session identifier.

In other aspects, the invention encompasses a computer apparatus and a computer-readable medium configured to carry out the foregoing steps.

2.0 Structural and Functional Overview

Figure 3:
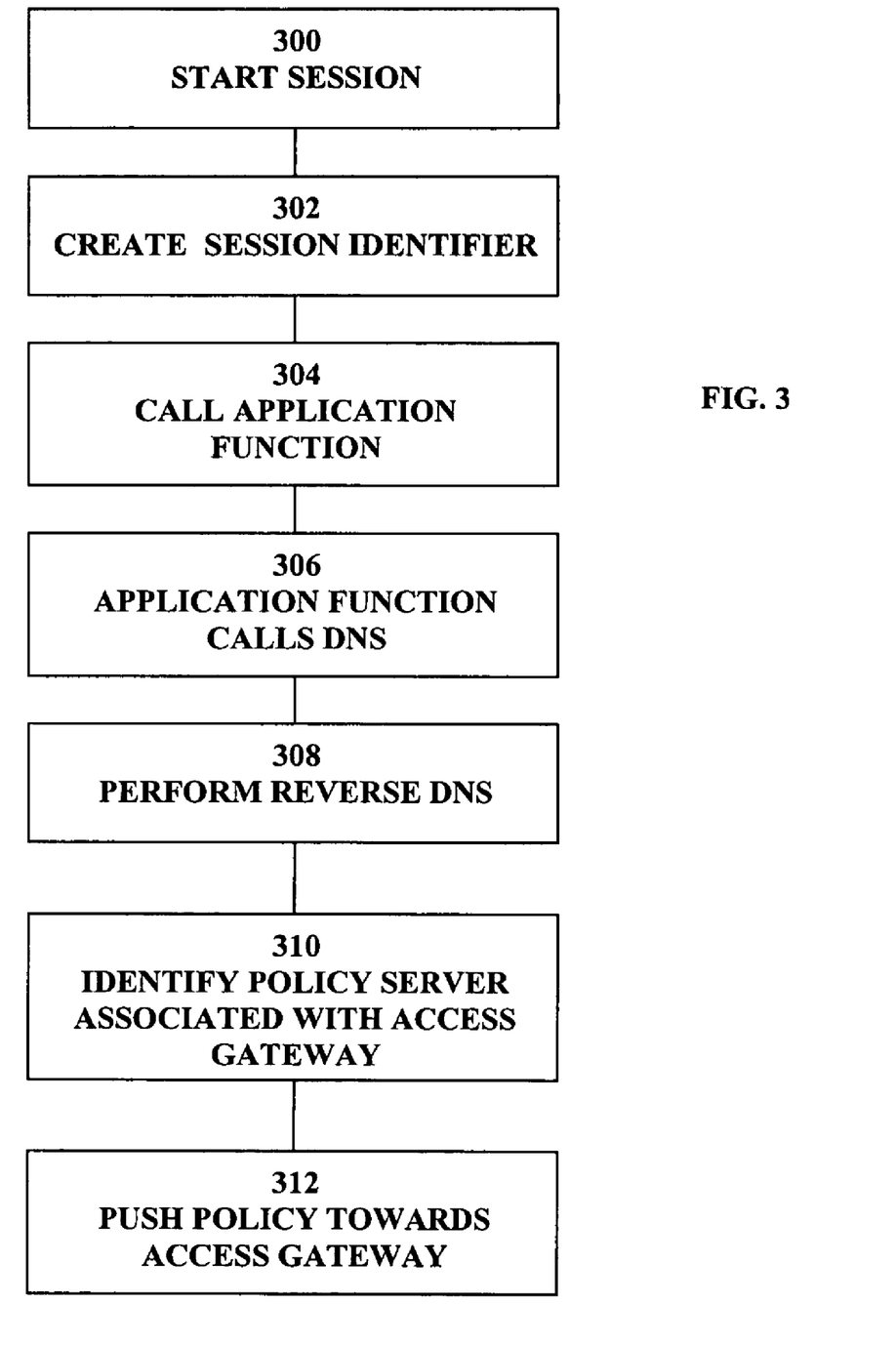
FIG. 3 is a flow diagram illustrating a high level view of a method for identifying a policy server.

In overview a method of identifying a policy server can be understood with reference to FIG. 3 which is a flow diagram illustrating a high level view of the method employed. In block 300 the session is started for example by a mobile station such as a cell phone or laptop wirelessly requesting a session via a BSS communicating with an access gateway. In block 302 a session identifier is created for example in the form of an IP (Internet Protocol) address dynamically allocated by the access gateway. As a result all packets to that IP address during the session will be forwarded by the access gateway to the mobile station invoking the session. In block 304 the mobile station calls the application function and in particular sends an appropriate data message to the relevant application server requesting an application function such as media content delivery. The data message includes the session identifier.

In block 306 the application function commences policy server discovery for the session. In particular the application function needs to establish which policy server serves the access gateway for the session. This can be done by extracting the IP address assigned as session identifier to the mobile session from the data message invoking the application function. In particular, in block 306, the application function calls a domain name server and (DNS) and requests a reverse DNS lookup on the session identifier. The DNS is described in more detail below but in particular retains a database resolving domain names to IP addresses. As part of the method, reverse DNS records are created as a preparatory step, mapping an IP address to a policy server associated therewith. In block 308 the DNS performs a reverse DNS lookup procedure on the IP address extracted by the application function. The reverse DNS procedure establishes the policy server address associated with the extracted IP address. The DNS server passes the policy server address in a result message back to the application function.

Accordingly in block 310 the application function is able to identify the policy server associated with the access gateway and in block 312 the application function pushes the appropriate policy to the access gateway via the discovered policy server. As a result the application function is able to identify the policy server which controls the access gateway associated with a particular IP flow using the only attribute known to it, namely the user IP address serving as a session identifier. As a result dynamic discovery of policy servers is enabled.

The method can be extended to protocols such as mobile IP in which case the policy server identified may be the mobile station's home network policy server proxy.

It will be appreciated that in order to implement the policy server discovery method it is necessary to allocate reverse DNS records at the DNS mapping the IP address assigned to the session to the policy server address and this can be implemented in various manners as described in more detail below.

3.0 Method of Identifying a Policy Server

The skilled reader will recognize that the method described herein can be implemented in any appropriate manner, but for the purposes of ease of understanding a more detailed implementation will be described with regard to the universal mobile telecommunications system (UMTS) which incorporates general packet radio service (GPRS) technology as set out by the Third Generation Partnership Project (3GPP). The implementation is described in, for example, "UMTS and IPv6" which is available at the time of writing on the file "UMTS_IPv6_rev3_IPNG.pdf" in the directory "pub/ipng/html/presentations/May 2001" of the domain "http://playground.sun", the entire contents of which are incorporated herein by reference for all purposes as if fully set forth herein. This approach is well understood by the skilled reader and well documented in pre-existing documentation and therefore is only described in summary here.

Figure 4:
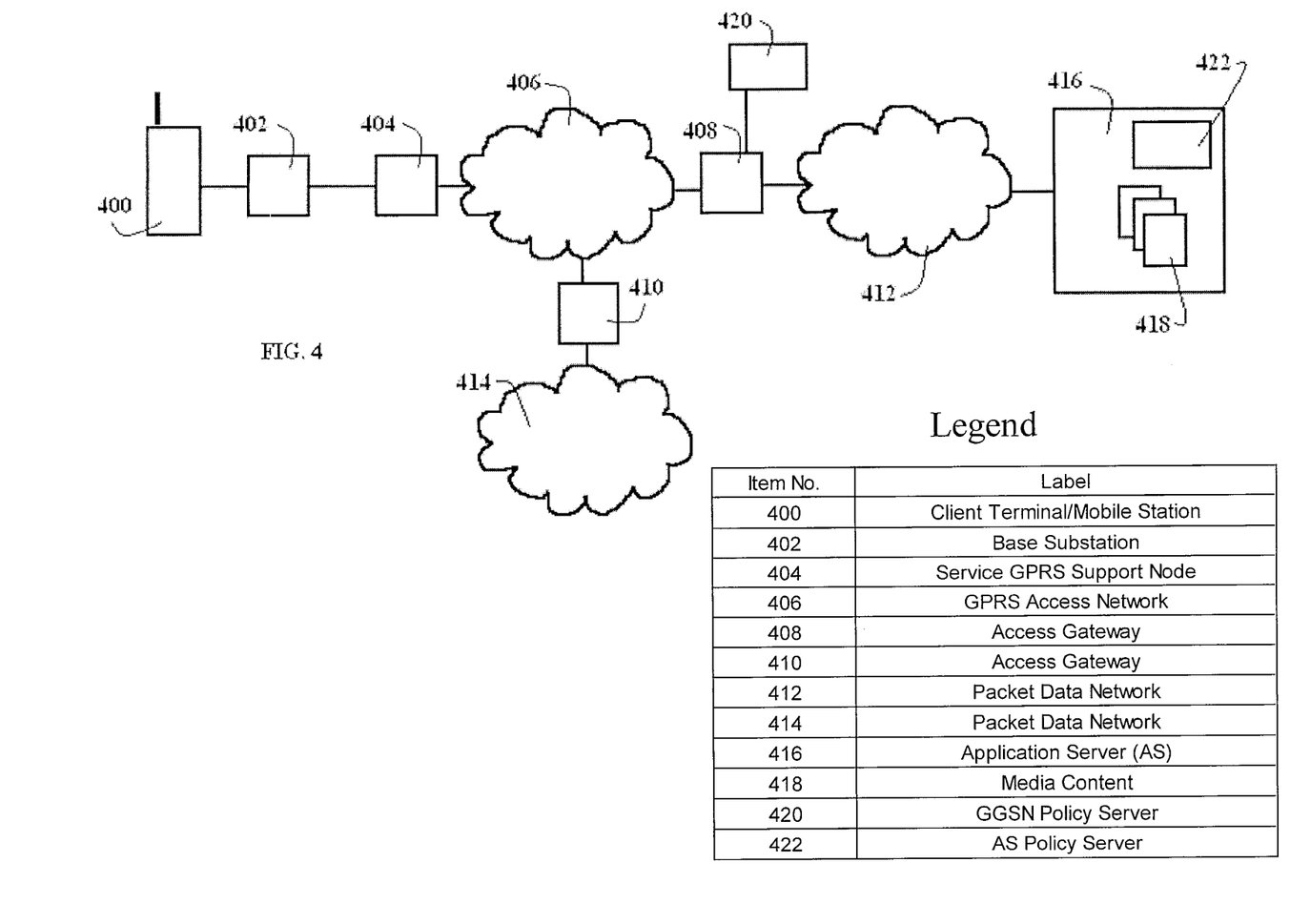
FIG. 4 is a block diagram illustrating a network implementing the method of identifying a policy server.

Reference is made to FIG. 4 which is a network diagram showing an illustrative network to which the method described herein is applied and FIG. 5 which is a flow diagram illustrating in more detail a method of identifying a policy server. A mobile station (MS) 400 communicates wirelessly with a base station sub-system (BSS) 402 which can include, for example, a base transceiver system and base status controller. The BSS 402 communicates with a Service GPRS Support Node 404 which is part of a GPRS access network 406. The GPRS network 406 comprises one or more access gateways 408, 410 in the form of Gateway GPRS Support Nodes (GGSN) each of which is a gateway to a packet data network (PDN) 412, 414 respectively. The PDN can be any appropriate packet network such as the Internet and is identified by an associated access point name (APN). In the example shown the PDN 412 is connected to an application server 416 which provides an application function such as provision of media content 418.

Figure 5A:
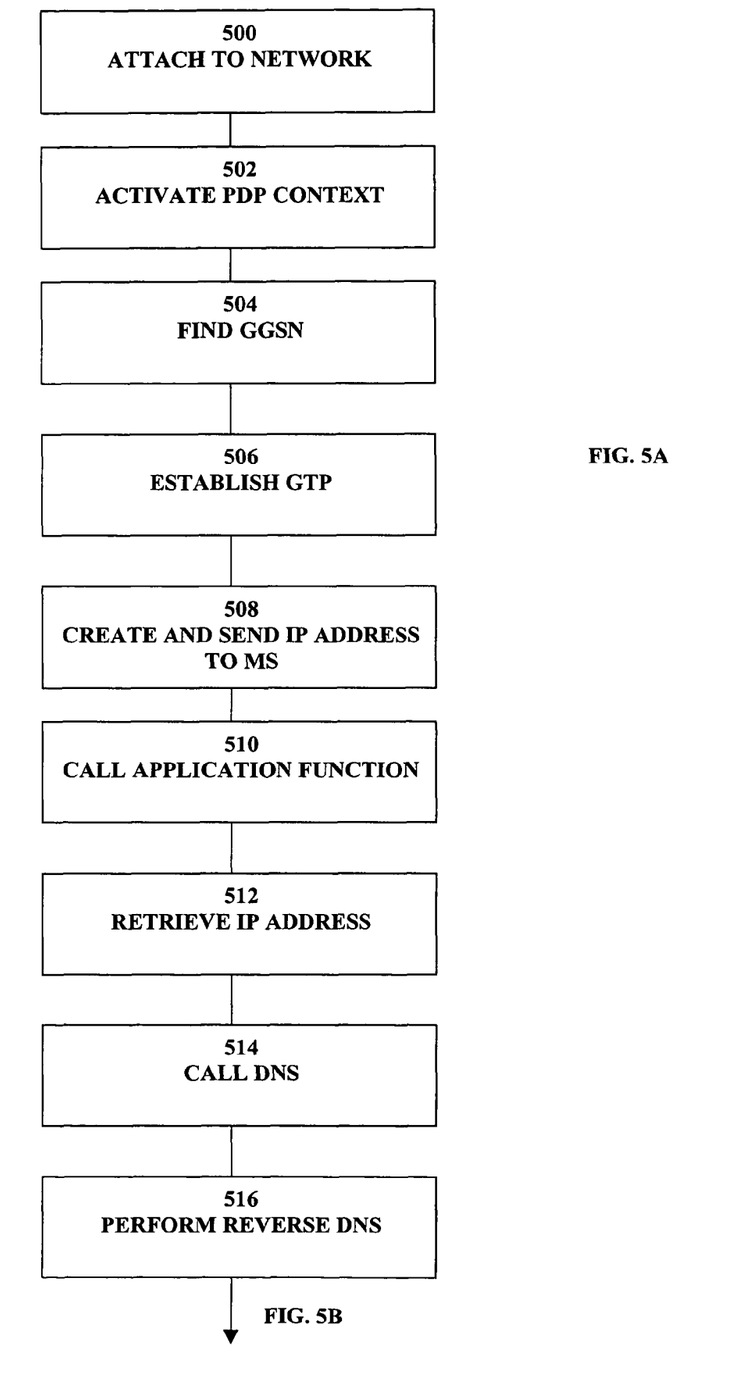
FIG. 5A is a flow diagram illustrating in more detail the steps involved in identifying a policy server.

Referring to FIG. 5A, in block 500 the MS 400 attaches to the network by connecting with the BSS 402 and carrying out initial connection and authentication steps as appropriate. In block 502 the MS sets up a session by activating a packet data protocol (PDP) context. In particular a request is sent to the SGSN 404 including the APN of the network required (for example the APN of the network hosting the application server 416), the IP address of the MS if it exists, the required QoS, routing information and so forth.

In block 504 the SGSN 404 finds the or a GGSN serving the APN, in this case GGSN 408 although alternatively the GGSN could be the GGSN serving the home network for the MS 400 dependent on the APN required. The GGSN can be found from the APN for example using DNS. It will be noted that multiple PDP contexts may be activated for example for different services to the same MS (such as web browsing, streaming content) and/or to multiple GGSNs.

In block 506 a tunnel is established between the SGSN and the GGSN using gateway tunnel protocol (GTP) and appropriate additional authentication and security steps are carried out by the GGSN. In block 508 the GGSN establishes an IP address for the session and sends it to the MS. The IP address can be selected in any appropriate manner. For example the GGSN can maintain a pool of IP addresses and select an IP address from the pool in round robin fashion or can use dynamic host configuration protocol (DHCP) to assign an IP address to a mobile session. Alternatively the MS can have a static address in which case the user provides the static IP address in the context establishment and then this request is routed to the GGSN, resolved by the DNS.

In block 510 the MS calls the application function by sending an appropriate message to invoke the application function. In block 512 the application function retrieves the session IP address, i.e. the source address of the message calling the application function. In block 514 the application function calls the DNS. The operation of DNS is well understood by the skilled reader and well documented in previous existing documentation and therefore is only described in summary here for the purposes of ease of understanding. In particular a name server maintains a database of address (A) records associating domain names of the form, for example, "www.aaa.bbb" with a corresponding IP address of the form xxx.xxx.xxx.xxx. Accordingly a browser or node needing to access a network location described by a domain name can retrieve the IP address by sending an appropriate DNS request. It will be appreciated that DNS services are typically distributed amongst multiple DNSs and that in practice DNS requests may be transferred from higher domain names servers down to lower level domain name servers to obtain an IP address in the conventional manner. In particular in block 516 the name server performs a reverse DNS, retrieving the policy server address associated with the IP address extracted from block 512 including the policy server IP address.

Figure 5B:
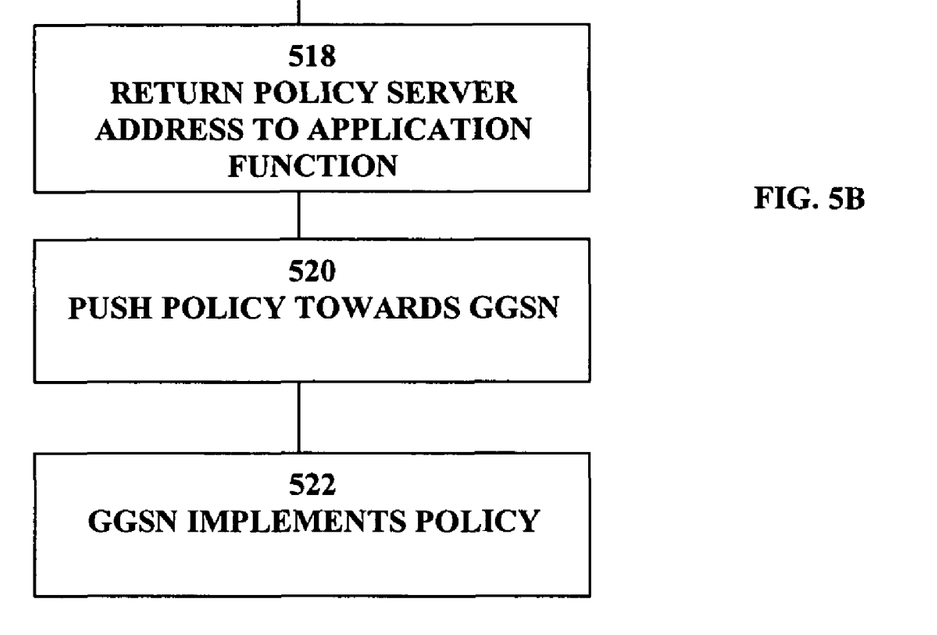
FIG. 5B is a flow diagram comprising a continuation of FIG. 5A.

In block 518 the name server returns the policy server address for the GGSN 408; in this case policy server 420 may comprise a policy decision function (PDF). In block 520 the application function pushes the appropriate policy towards the GGSN 408. For example the application server can retrieve an appropriate policy, based on the media content demanded or the source IP address, from its own policy server 422 and push this to the GGSN policy server 420 in a one stage operation. Alternatively, in a two stage operation, in a first push the relevant resources can be reserved and in a second push the policy can be committed and actioned.

In block 522 the GGSN implements the policy which may be, for example, identification of the appropriate network bearer for the media content, appropriate QoS such as predefined bandwidth or a charging policy ensuring that charging per packet or per IP flow content is passed on to the home network operator for charging to the user.

It will be appreciated that more complex policy implementation can be adopted. For example in a parallel PDP context the MS may set up a mobile session with the GGSN to the user's home network operator and the home network operator may identify the policy server for the associated GGSN in order to push an appropriate policy towards it for example for ensuring correct charging of the user for use of the foreign network to which it has attached.

Alternatively again, the approach extends to the case of mobile IP which is described at the time of writing in the file "rfc3775.html" in the directory "rfcs" of the domain "faqs.org" on the World Wide Web. A mobile node (MS) attaching to a remote access network ("Foreign Agent") carries out a binding operation with the mobile node's home network ("Home Agent"). As a result the home network is provided with the mobile node's access network care of address. In this case the policy server identified by the DNS procedure corresponds to a policy server in the MS's home network, that is, the network associated with the extracted IP address. Accordingly when contacted by the application function the policy server proxy in the home network can perform a translation of the source address from one which is topologically part of the home network to one which is topologically part of the access network. The policy server proxy then forwards the message to the policy server in the access network for example using the DNS lookup technique described above. As a result even though the application function may see a source address which is topologically part of the home network and not the access network, the appropriate policy can be pushed to the appropriate policy server, the GGSN acting as foreign agent or, in the absence of mobile IP capabilities, allowing operation with a co-located care-of address.

As a result a distributed policy approach is provided allowing multiple application functions to support services using different access gateways and/or access technologies, as the application function is able to identify the policy server which controls the access gateway associated with the particular IP flow.

The reverse DNS record can be created using techniques such as those described in "Reverse Zone/in-addr.arpa" which is available at the time of writing on the file "df_reverse.htm" in the directory "help" of the domain "jhsoft.com" of the World Wide Web, the entire contents of which are incorporated herein by reference for all purposes as if fully set forth herein. Whereas a DNS record uses an A record to relate an IP address to a domain name, a reverse DNS record assigns a domain name to an IP address. The reverse record is maintained in a separate set of data in the form of a pointer (PTR) record as a result of which a reverse DNS record does not necessarily have a one to one relationship with the normal DNS record. As a result it is possible to map the IP address for a mobile session to a policy server domain name which is different from the domain name assigned to the IP address itself and which may be in the form of a symbolic or mnemonic domain address. The policy server address can be included for example by storing the record in the same manner as an MX (mail exchange) name. Alternatively, the domain name associated with the policy server can then be mapped back to the IP address of the policy server in a further DNS query.

In order to assign the policy server address to the IP address for the mobile session, therefore, it is simply necessary to create PTR records in the DNS when creating the addresses assigned by the GGSN to mobile sessions mapping each created IP address pooled at the GGSN to the policy server address. Accordingly when one of the pooled addresses is assigned to a mobile session, the application function can simply extract the assigned IP address and retrieve from the PTR record the policy server address. As a result a new DNS record is defined identifying the policy server to be contacted if a third party wishes to have policy enforced for a particular IP flow. It will be appreciated that one policy server can serve multiple IP addresses.

Although the above discussion is presented in the context of a wireless mobile network implemented on UMTS it will be appreciated that the approach can be applied to any network requiring implementation of a distributed policy approach. For example the method can be applied in relation to Digital Subscriber Line (DSL) networks in which case the access gateway is the B-RAS. Similarly the method can be applied in the case of a Radio Access Network (RAN) where the access gateway is the Packet Data Serving Node (PDSN) or PacketCable in which case the access gateway is the Cable Modem Termination System (CMTS) using the Application Manager to Policy Server interface. Generally speaking the method is advantageous in cases where an application function is in a different administrative domain to a client server and it is required to push a policy towards an access gateway, for example the first hop router in the network to which the client node attaches, by identification of an address used by the client node.

It will further be appreciated that the method described above can be implemented in conjunction with, or addition to, any appropriate Internet protocol such as IPv4, IPv6 or mobile IPv6. Appropriate protocols can be put in place to allow roaming of a client node during a mobile session with seamless policy implementation using, for example mobile Ipv6.

It will further be appreciated that the method steps described above can be coded or implemented in any appropriate manner and either implemented at each participating element or incorporated into an appropriate session initiation routine between the client node and the application function.

4.0 Implementation Mechanisms—Hardware Overview

Figure 6:
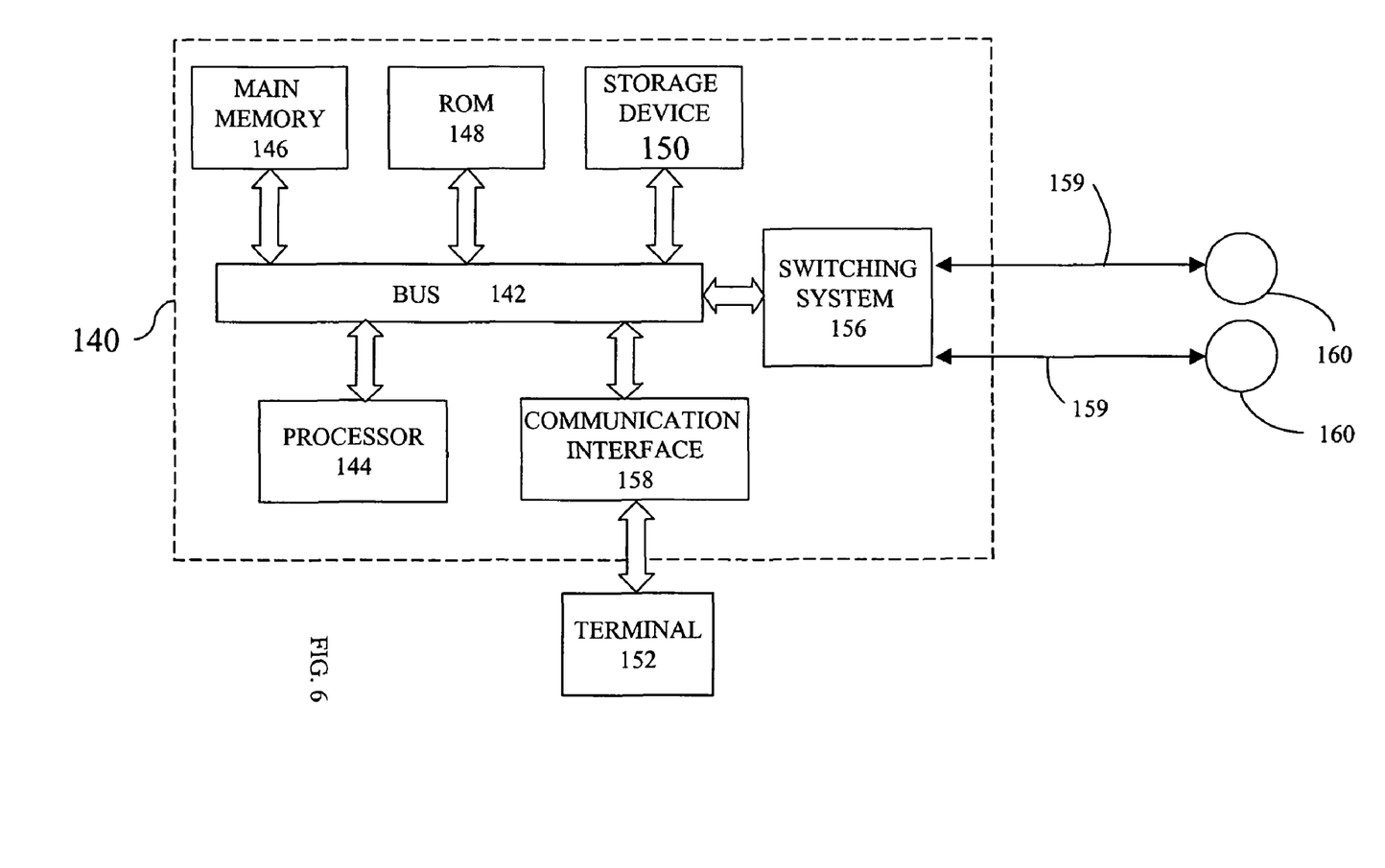
FIG. 6 is a block diagram illustrating a computer system upon which a method of identifying a policy server may be implemented.

FIG. 6 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a MS, GGSN, DSN or Application server, as appropriate, the above described method of identifying a policy server. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate communication protocol and mechanism can be adopted to implement the invention. The method steps set out can be carried out in any appropriate order and aspects from the examples and embodiments described juxtaposed or interchanged as appropriate.

Any appropriate type of policy can be implemented and multiple policies can be implemented by multiple invoked application functions simultaneously. Any appropriate type of application function can form part of a session and invoke a policy for example a session initiation protocol (SIP). The policy server address can be obtained from any appropriate database storing appropriate records, for example a name server.

What is claimed is:

1. A method comprising:
   receiving, from a network access node, a session request from an invoking node on a network to invoke a session with an application server;
   wherein the session includes a remotely invoked application function;
   extracting a session identifier from the session request;
   wherein the session identifier comprises a network address for the invoking node;
   based at least in part on the network address for the invoking node, obtaining, at the application server, a policy server address for a policy server for the network access node from a mapping associating invoking node addresses with policy server addresses;
   the application server establishing a policy at the policy server corresponding to the policy server address;
   wherein the method is performed by one or more processors.

2. A method as claimed in claim 1 in which the invoking node is a mobile node.

3. A method as claimed in claim 1 in which the session identifier is assigned by the network access node.

4. A method as claimed in claim 1 in which the network address comprises an IP address.

5. A method according to claim 1 or 4 in which the step of obtaining the policy server address comprises performing a reverse DNS procedure on the network address for the invoking node.

6. A method as claimed in claim 1 in which the session identifier is a session source address.

7. A method as claimed in claim 6 in which said step of obtaining a policy server address comprises requesting resolution of the session source address from a name server.

8. A method as claimed in claim 1 in which the policy server is a proxy policy server on an invoking node home network.

9. An apparatus comprising:
   one or more processors;
   a computer-readable storage medium storing one or more sequences of instructions that, when executed by the one or more processors, causes the processors to perform:
   receiving at an application server, from a network access node, a session request from an invoking node to invoke a session with the application server;
   wherein the session includes a remotely invoked application function;
   extracting a session identifier from the session request at the application server;
   wherein the session identifier comprises a network address for the invoking node; and
   obtaining, at the application server, a policy server address for a policy server for the network access node from a mapping associating invoking node addresses with policy server addresses based at least in part on the network address for the invoking node;
   the application server establishing a policy at the policy server corresponding to the policy server address.

10. An apparatus as claimed in claim 9 in which the invoking node is a mobile node.

11. The apparatus as claimed in claim 9 wherein the instructions comprise instructions that cause assigning a session identifier.

12. An apparatus as claimed in claim 11 wherein the session identifier comprises a network address assigned to the invoking node by the network access node.

13. The apparatus as claimed in claim 9 in which the network address comprises an IP address.

14. The apparatus as claimed in claim 13 wherein the instructions for obtaining the policy server address comprise instructions that cause performing a reverse DNS procedure on the IP address for the invoking node.

15. An apparatus as claimed in claim 9 in which the session identifier is a session source address.

16. An apparatus as claimed in claim 15 wherein the instructions for obtaining a policy server address comprises instructions that cause requesting derivation of the address from a name server.

17. An apparatus as claimed in claim 9 in which the policy server is a proxy policy server on an invoking node home network.

18. A computer-readable volatile or non-volatile storage medium storing one or more sequences of instructions which, when executed by one or more processors, cause the one or more processors to carry out:
   receiving, from a network access node, a session request from an invoking node on a network to invoke a session with an application server;
   wherein the session includes a remotely invoked application function;

extracting a session identifier from the session request;

wherein the session identifier comprises a network address for the invoking node; and based at least in part on the network address for the invoking node, obtaining, at the application server, a policy server address for a policy server for the network access node from a mapping associating invoking node addresses with policy server addresses;

the application server establishing the policy at the policy server corresponding to the policy server address.

19. The computer-readable medium of claim 18, wherein the invoking node is a mobile node.

20. The computer-readable medium of claim 18, wherein the policy server is a proxy policy server on an invoking node home network.

21. An apparatus comprising:

one or more processors; and a network interface communicatively coupled to the one or more processors and configured to communicate one or more packet flows among the one or more processors and the network and a computer-readable volatile or non-volatile storage medium storing one or more sequences of instructions for identifying a policy server in relation to a session invoked by an invoking node on a network via a network access node, which when executed by one or more processors, cause the one or more processors to carry out, at an application server:

receiving, from a network access node, a session request from an invoking node on a network to invoke a session with an application server;

wherein the session includes a remotely invoked application function;

extracting a session identifier from the session request;

wherein the session identifier comprises a network address for the invoking node; and based at least in part on the network address for the invoking node, obtaining a policy server address for a policy server for the network access node from a mapping associating invoking node addresses with policy server addresses;

the application server establishing the policy at the policy server corresponding to the policy server address.

22. The apparatus of claim 21, wherein the invoking node is a mobile node.

23. The apparatus of claim 21, wherein the policy server is a proxy policy server on an invoking node home network.

24. A computer-readable storage medium storing one or more sequences of instructions that, when executed by one or more processors, causes the processors to perform:

receiving, from a network access node, a session request from an invoking node on a network to invoke a session with an application server;

wherein the session includes a remotely invoked application function;

extracting a session identifier from the session request;

wherein the session identifier comprises a network address for the invoking node;

based at least in part on the network address for the invoking node, obtaining, at the application server, a policy server address corresponding to a policy server for the network access node from a mapping associating invoking node addresses with policy server addresses;

the application server establishing the policy at the policy server corresponding to the policy server address.

* * * * *